United States Patent
Steiger

(10) Patent No.: US 9,933,885 B2
(45) Date of Patent: Apr. 3, 2018

(54) MOTOR VEHICLE OPERATING DEVICE CONTROLLING MOTOR VEHICLE APPLICATIONS

(71) Applicant: e.solutions GmbH, Ingolstadt (DE)

(72) Inventor: René Steiger, Oberelchingen (DE)

(73) Assignee: E.Solutions GmbH (DE)

( * ) Notice: Subject to any disclaimer, the term of this patent is extended or adjusted under 35 U.S.C. 154(b) by 163 days.

(21) Appl. No.: 14/824,470

(22) Filed: Aug. 12, 2015

(65) Prior Publication Data
US 2016/0054849 A1 Feb. 25, 2016

(30) Foreign Application Priority Data
Aug. 20, 2014 (DE) .................... 10 2014 012 550

(51) Int. Cl.
*G06F 3/041* (2006.01)
*G06F 3/0488* (2013.01)

(52) U.S. Cl.
CPC .......... *G06F 3/0416* (2013.01); *G06F 3/0414* (2013.01); *G06F 3/0488* (2013.01); *B60K 2350/1004* (2013.01); *G06F 2203/04104* (2013.01); *G06F 2203/04808* (2013.01)

(58) Field of Classification Search
CPC .. G06F 3/0416; G06F 3/0488; G06F 3/04886; G06F 3/0414; G06F 2203/04104; G06F 2203/04808; B60K 2350/1004; B60K 2350/1052
USPC ................... 345/173–174; 178/18.01, 18.03, 178/18.05–18.07
See application file for complete search history.

(56) References Cited

U.S. PATENT DOCUMENTS

| | | | | |
|---|---|---|---|---|
| 8,677,284 B2* | 3/2014 | Aguilar | ............... | G06F 3/04815 715/830 |
| 2008/0163131 A1* | 7/2008 | Hirai | ..................... | G06F 3/0425 715/863 |
| 2011/0060499 A1* | 3/2011 | Suzuki | ................... | G06F 3/017 701/36 |
| 2013/0222274 A1* | 8/2013 | Mori | ..................... | B60K 37/06 345/173 |
| 2014/0195953 A1* | 7/2014 | Sakai | .................. | G06F 3/04883 715/771 |

(Continued)

*Primary Examiner* — Rodney Amadiz
(74) *Attorney, Agent, or Firm* — Tarolli, Sundheim, Covell & Tummino LLP

(57) ABSTRACT

A motor vehicle operating device is presented that comprises a presence-sensitive sensor device and is configured to provide, in a motor vehicle, an activated first application and at least one deactivated further application. A driver can control an activated application by means of the presence-sensitive sensor device and cannot control a deactivated application by means of the presence-sensitive sensor device. The motor vehicle operating device is configured to receive an input signal, which refers to a number of input objects with which the input is made at the presence-sensitive sensor device, wherein different numbers of input objects are assigned to the applications. OIf the input signal refers to a number of input objects assigned to the first application, control of the first application takes place and, if the input signal refers to a number of input objects assigned to the further application, activation of the further application takes place.

12 Claims, 3 Drawing Sheets

(56) References Cited

U.S. PATENT DOCUMENTS

2014/0304636 A1\* 10/2014 Boelter ............... G06F 3/04883
  715/771
2014/0359504 A1\* 12/2014 Kim ..................... G06F 3/0488
  715/768

\* cited by examiner

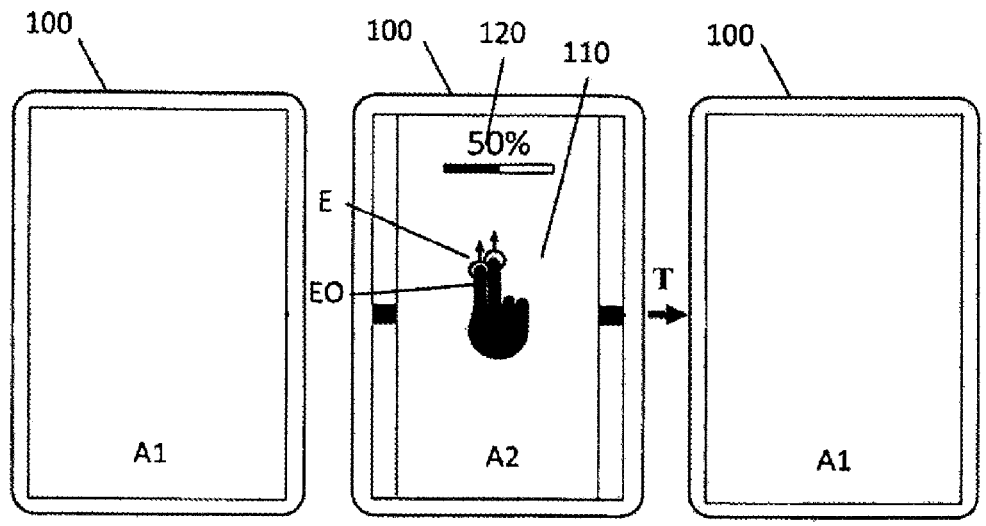
Fig 1a  Fig 1b  Fig 1c
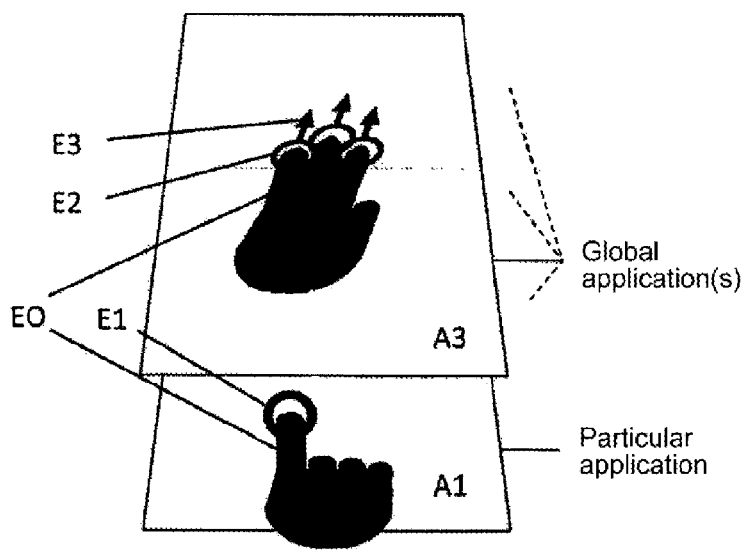
Fig. 2

MOTOR VEHICLE OPERATING DEVICE CONTROLLING MOTOR VEHICLE APPLICATIONS

RELATED APPLICATIONS

The present invention claims priority from German Application No. 10 2014 012 550.5, filed on 20 Aug. 2014, the entirety of which is incorporated herein by reference.

TECHNICAL FIELD

The present disclosure relates generally to the field of motor vehicle operating devices. It relates in particular to a motor vehicle operating device for controlling motor vehicle applications by means of a presence-sensitive sensor device.

BACKGROUND

In the field of automotive technology, the number of functions made available to the driver of a motor vehicle has steadily risen. At the same time, increasingly complex control options are offered for different functions. Above all, the integration of electronic devices into motor vehicles has sharply accelerated the increase in control options that a driver can select during the journey.

In the motor vehicle, however, problems in designing a suitable operating interface result from an increased number of available functions and control options. On the one hand, the space available for arranging easily accessible operating elements in the range of the driver is limited. On the other hand, road traffic safety demands that the driver can find safety-relevant or frequently used control elements easily and can also operate these "blind" where possible.

To provide a large number of primarily electronic functions without overloading the driver's area with operating elements, electronic display and input systems have been installed increasingly recently as multifunctional operating elements, such as touchscreens in the area of the centre console, for instance. In connection with such systems, a menu-like breakdown of control options facilitates virtually any expansion of controllable vehicle devices.

While the use of touchscreens as part of a vehicle system can thus contribute to saving a plurality of conventional operating elements, a clear arrangement of the control options can only be achieved in turn with difficulty as part of such touch operation. Above all, branched selection menus call for a very high degree of attentiveness for their operation. This is particularly disadvantageous if the driver wishes to control the pertinent vehicle device during the journey.

A technique that improves the operation of controllable motor vehicle devices is therefore desirable.

SUMMARY

According to a first aspect, a motor vehicle operating device is described for controlling motor vehicle applications. The motor vehicle operating device comprises a presence-sensitive sensor device and is configured to provide, in the motor vehicle, an activated first application and at least one deactivated further application, wherein a driver can control an activated application by means of input at the presence-sensitive sensor device and cannot control a deactivated application by means of input at the presence-sensitive sensor device, to receive an input signal, which refers to a number of input objects with which the input is made at the presence-sensitive sensor device, wherein different numbers of input objects are assigned to the applications, and if the input signal refers to a number of input objects assigned to the first application, to control the first application on the basis of the input signal and, if the input signal refers to a number of input objects assigned to the further application, to activate the further application.

The activating of an (e.g. the further) application can comprise providing optical, acoustic and/or haptic information to the driver by means of the application. Optical information can be output at a display device. The controlling of an (e.g. the first) application can comprise changing a setting and/or an actuating value of the application.

The presence-sensitive sensor device can comprise a contact sensor and/or a contactless gesture sensor. In addition or alternatively to this, the motor vehicle operating device can comprise a programmable processor. Furthermore, in addition or alternatively to this, the motor vehicle operating device can comprise a display device. The display device and the presence-sensitive sensor device can generally be components of a touchscreen of the motor vehicle operating device.

An input at the presence-sensitive sensor device can be made by means of fingers as input objects. The input signal can refer in this case to a number of up to five fingers of a hand of the driver, with which the input is made. In addition or alternatively to this, the motor vehicle operating device can be configured to provide between one and four further applications, to which different numbers of input objects are assigned.

The motor vehicle operating device can also be configured to output a control signal on the basis of controlling of an application. The motor vehicle operating device can be configured in this case to output the control signal to a controllable motor vehicle device.

According to a second aspect, a motor vehicle is described. The motor vehicle comprises a motor vehicle operating device of the type presented here and at least one controllable motor vehicle device. The further or each application can be configured in this case to determine a control signal for the motor vehicle device based on an input. The motor vehicle operating device can then further be configured to output the control signal to the motor vehicle device.

The motor vehicle device can be at least one of a motor vehicle audio system, a motor vehicle air conditioning system, a motor vehicle navigation system, a motor vehicle communication device for a motor vehicle online application, a motor vehicle communication device for a telephone application, a motor vehicle driver assistance system, a motor vehicle sliding roof, a motor vehicle external mirror and an automatic window winder. In addition or alternatively to this, the control signal can be related to a main function of the motor vehicle device. The control signal can be related to one of a volume of a motor vehicle audio system, a temperature of a motor vehicle air conditioning system, a map display of a motor vehicle navigation system, an operation of a motor vehicle communication device for a motor vehicle online application, an operation of a motor vehicle communication device for a telephone application, an operating state of a motor vehicle driver assistance system, a position of a motor vehicle sliding roof, a position of a motor vehicle external mirror and a position of an automatic window winder.

According to a third aspect, a method for controlling motor vehicle applications using a presence-sensitive sensor device is described. The method comprises providing, in the motor vehicle, an activated first application and at least one deactivated further application, wherein a driver can control an activated application by means of input at the presence-sensitive sensor device and cannot control a deactivated application by means of input at the presence-sensitive sensor device, receiving an input signal, which refers to a number of input objects with which the input is made at the presence-sensitive sensor device, wherein different numbers of input objects are assigned to the applications; and if the input signal refers to a number of input objects that is assigned to the first application, controlling the first application on the basis of the input signal and, if the input signal refers to a number of input objects that is assigned to the further application, activating the further application.

The method can further comprise deactivating the further application. The deactivating of the further application can take place if the further application is activated and if no further input that satisfies a preset condition is made.

The preset condition can require that the further input follows on without interruption from the input on the basis of which the further application was activated. Alternatively to this, the preset condition can require that the further input is made within a preset period following a previous input. In addition or alternatively to this, the preset condition can require that the further input is also made with the number of input objects that is assigned to the further application. Alternatively to this, the further input can be made with a number of input objects that is different from and/or independent of the number of input objects assigned to the further application. The further input can be made by the input objects remaining in the same position over a preset period as in the previous input. One or more periods preset in connection with the further input can be determined at least partially by the further application.

The method can further comprise, if the further application is activated and if a further input is made that satisfies the preset condition, controlling the further application on the basis of the further input.

The controlling of the further application can be carried out on the basis of a primary gesture, which comprises an at least substantially linear movement of the one or more input objects at the presence-sensitive sensor device. Here the input, on the basis of which the further application was activated, can comprise an arranging of a number of input objects assigned to the further application on the presence-sensitive sensor device and the control of the further application can be carried out on the basis of a subsequent linear movement of the input objects. The arranging and the movement of the input objects can be carried out here in a single input gesture.

In addition or alternatively to this, the input signal can also refer to one of several input areas of the sensor device, in which area the input is made. The control of the further application can take place, furthermore, on the basis of the input area. The number of input areas can be two to four.

The number of input objects assigned to the first application can be one. A number of input objects that amounts to more than one can be assigned to each further application.

The further application can be configured to determine a control signal for at least one controllable motor vehicle device on the basis of input. Furthermore, the method can comprise an output of the control signal.

The input areas of the sensor device can be assigned to different areas of a motor vehicle and the control signal determined with regard to the area of the motor vehicle to which the input area that the input signal refers to is assigned. Different input areas can be assigned to an area of the driver and an area of the passenger in the motor vehicle. In addition, different input areas can be assigned to other different seating areas in the motor vehicle.

Upon activation of an application, a previously activated application can be deactivated. In this case always precisely one application can be activated.

The activating of an application can further comprise the outputting of a display signal, which is assigned to the activated application. The display signal can be configured to refer to a controlling of the application on the basis of the input signal. The display signal can further be configured to refer to the area of the motor vehicle in relation to which the control signal is determined.

The method can further comprise providing a graphical display on the basis of the display signal. In addition or alternatively to this, the method can comprise, in the case of controlling and/or activating of an application, providing an acoustic and/or haptic signal.

According to a fourth aspect, a computer program product is described. The computer program product comprises portions of program code which, if they are executed on a processor unit of a motor vehicle operating device, cause the motor vehicle operating device to carry out the method of the type presented here.

BRIEF DESCRIPTION OF THE DRAWINGS

Further features, details and advantages of the present disclosure become clear from the following detailed description and from the drawings.

FIGS. 1a-1c show schematic representations of an embodiment for a motor vehicle operating device with different activated motor vehicle applications;

FIG. 2 shows a schematic representation of a level model for a method for controlling motor vehicle applications;

DETAILED DESCRIPTION

Figure 3:
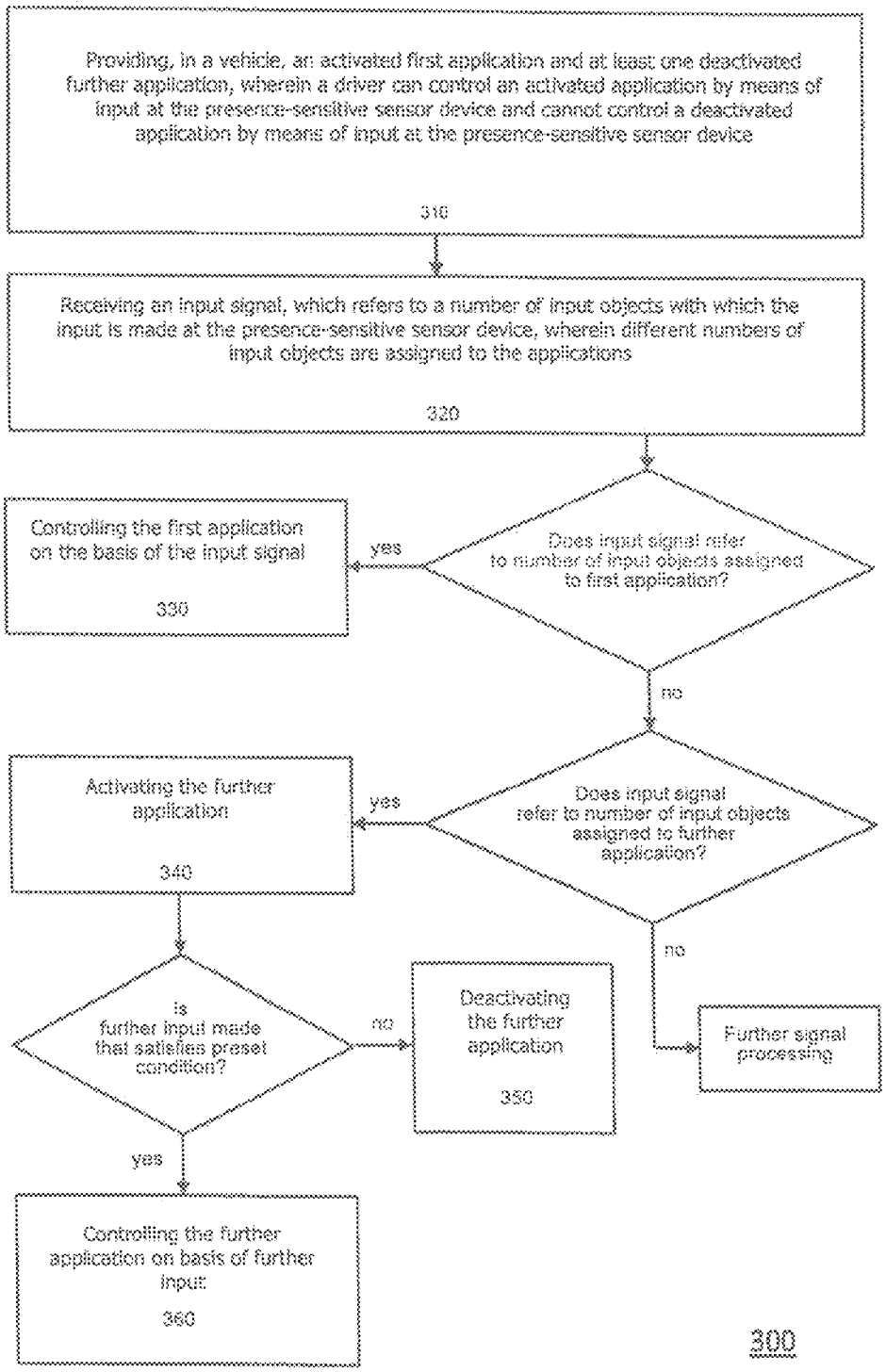
FIG. 3 shows a flow chart of an embodiment for a method for controlling motor vehicle applications.

FIGS. 1a-1c show schematic representations of an embodiment for a motor vehicle operating device 100 with respectively different activated motor vehicle applications A1, A2.

The motor vehicle operating device 100 comprises a presence-sensitive sensor device 110 and a display device for outputting a graphical display 120. In the example shown, the presence-sensitive sensor device and the display device 110 of the motor vehicle operating device 100 are combined in the form of a touchscreen. The operating device 100 is further configured to provide different motor vehicle applications A1, A2 and to detect by means of the presence-sensitive sensor device 110 user inputs E at the sensor device 110, which can be made by means of different numbers of input objects EO.

The motor vehicle operating device 100 is part of a vehicle system, for example. In this case the motor vehicle operating device 100 is installed, for example, in the area of a central console or a dashboard as a multifunctional operating element for controllable vehicle devices in the access area of the driver.

FIG. 1a shows the operating device 100 in an operating mode in which a first application A1 is activated. The first application A1 can be any type of motor vehicle application, which provides a driver with information or options for interaction with vehicle devices, for example. The application A1 is an application, for example, which offers the driver targeted access to different control options in a conventional manner via represented selection menus or a plurality of represented operator interfaces. In the example shown of a touchscreen 110, such an application A1 is typically operated with a single finger of a hand. In the present example, a single input object is therefore assigned to the application A1 for its operation.

FIG. 1b shows the operating device 100 in a second operating mode deviating from the first from FIG. 1a. Here the application A2 is activated instead of the application A1, while an input E is made at the presence-sensitive sensor device 110 by means of two input objects EO. Starting out from the first operating mode from FIG. 1a, the detection of the input E, which refers to a number of input objects EO assigned to the application A2, leads to the application A1 being temporarily deactivated and the application A2 being activated on receipt of the input E. In the example shown, the input E is made by two fingers of a hand, i.e. by two input objects. The number of two input objects is assigned here to the application A2.

The activation of the application A2 has the effect that the driver can now control the application A2 instead of the previously activated application A1 by further input. In the example shown, the further input consists in a linear movement of the overlying two fingers in the direction of an upper area of the presence-sensitive sensor device 110. Due to this, an actuating value of the application A2 is increased, for example. On the basis of an actuating value of a certain application A2 increased in this way, a control signal can be determined by the motor vehicle operating device 100 and be output to a motor vehicle device assigned to the application A2. For example, the volume level of a motor vehicle audio system can be assigned to the application A2, which is increased by the operating gesture shown.

For feedback on the activation of the application A2 and the change of an actuating value of the application A2, a graphical display 120 is output by the operating device 100. This is configured in such a way that it displays the activation of the application A2 and the change made in an actuating value recognizably for the driver even out of the corner of the eye. In some examples the driver can even be informed via acoustic or haptic feedback, for instance in the form of a vibration, about a switch in the activated application and a change made to a setting or an actuating value, without the driver having to divert his attention from traffic events.

In the example shown, activating the application A2 is carried out solely on the basis of the number of input objects EO detected by the presence-sensitive sensor device 110. The input can be made, therefore, at any point of the presence-sensitive sensor device 110. In addition, the gesture shown for changing an actuating value of the application A2 is intuitively easily graspable in the form of a linear movement and a corresponding increase or reduction in the actuating value. The switch shown from the application A1 to the application A2 and the corresponding control of the related vehicle device can thus be achieved by the driver completely in a manner that demands the minimum of attention from the driver. The control shown of the application A2 is thus suitable especially for blind operation of the assigned vehicle device.

FIG. 1c shows the operating device 100 in a third operating mode, in which following the control carried out of the application A2, this is deactivated again and the first application A1 is activated once more. The deactivation of application A2 and the renewed activation of the application A1 take place automatically here on the basis of a preset condition T. For example, the switch from the application A2 to the application A1 takes place automatically as soon as no further input is made by the driver over a certain period to the input E to control the application A2.

The switch of the motor vehicle operating device 100 shown in FIGS. 1a-1c between different operating modes follows a hierarchy of the different applications A1, A2 here. A basic setting of the operating device 100 provides for an activation of the first application A1 in this case. For example, the application A1 is a special or particular application selected or activated by the driver in a conventional manner from among several motor vehicle applications. In contrast, the application A2 is directed to the control of a certain safety-relevant or frequently used vehicle device, to which the driver should advantageously have easy and quick access at any time and independently of an activated particular application A1.

The switch shown in FIGS. 1a to 1c of operating modes as a function of a number of input objects EO at the presence-sensitive sensor device 110 permits a driver, for example, to increase a volume level of the audio system of the vehicle without having to deactivate a currently activated particular application A1 in the long term and then to have the previously selected application A1 made available again.

The operating device 100 is arranged in the area of the central console of a vehicle, for example, for the purpose of single-handed operability. In addition to a conventional selection of particular applications A1, the technique described here makes it possible to provide up to four further applications A2, to which the driver has direct access at any time by a corresponding number of fingers used. Compared to the particular applications A1, the further, generally accessible applications are thus regarded as global applications.

Each global application can in addition be controllable with reference to several actuating values and setting by corresponding intuitive gestures. For example, a control gesture in a vertical direction can change a first actuating value for a certain further application A2 and a control gesture in a horizontal direction can change a second setting or a second actuating value. For the purpose of simple and intuitive operability of the further applications A2, however, these are limited to a minimum selection of particularly relevant applications and in each of these applications in turn to a minimum number of controllable actuating values. Thus a further application of the operating device 100 for changing the volume level of an audio system of the vehicle, another further application for changing a temperature actuating value of an air conditioning system of the vehicle, yet another further application for representing a map of a navigation system and a further application for locking the vehicle doors or for actuating automatic window winders of one or more windows of the vehicle is provided. In other examples, one or more of the aforesaid applications are replaced by applications for changing an operation of a motor vehicle communication device for a motor vehicle online application, for example, an operation of a motor vehicle communication device for a telephone application, an operating mode of a motor vehicle driver assistance system, a position of a motor vehicle sliding roof or a position of a motor vehicle external mirror.

In the example shown in FIG. 1c, the deactivation of the application A2 and the renewed activation of the particular application A1 take place after a preset period T, during which no further user input has taken place when the application A2 is activated. In other examples, however, the deactivation of the further application A2 can be determined by other conditions, for instance if no further input is made that satisfies one or more preset conditions when application A2 is activated. For example, the application A2 can be deactivated directly following the input E in the manner of an "on-release" deactivation. In this case both the activation of the application A2 and possible control are carried out by a single, for example a continuous, input gesture of the driver. While such an "on-release" deactivation is advantageous for changing a temperature or volume level actuating value, for example, in other applications, such as a navigation application, it is desirable if this remains activated for a certain period even after an input E has been made. The condition T for deactivation of a further application A2 is therefore determined individually by the respective application A2, for example.

Even if in the example of FIG. 1b the control gesture is made, furthermore, with the same number of input objects by which the application A2 was activated, it is not necessary in other examples that a control input made when application A2 is activated is likewise made with the assigned number of input objects. For example, touching the presence-sensitive sensor device with the assigned number of input objects can cause an activation of the further application A2, whereupon the user can perform control of the further application A2 with any number of input objects A2. This is advantageous in a telephone application, for example, which is activated by an assigned number of input objects, whereupon a stored contact can be selected from a displayed telephone book by a single finger. The same applies for the possibility of a selection from a media database for reproducing media data by an infotainment system of the motor vehicle.

FIG. 2 shows a schematic representation of a level model for a method for controlling motor vehicle applications, for example by means of a motor vehicle operating device according to FIGS. 1a-1c.

The level model in FIG. 2 shows a basic level, which is represented by the particular application A1. The particular application A1 corresponds in this case to an application selected individually by the driver, which can consist of any application provided by the operating device 100 of FIG. 1. The particular application A1 is the preferably activated application on the operating device 100 in this case. The preferred activation of the application A1 results for example from the fact, for example, that the application A1 is always activated automatically if no input is made at the operating device 100 that satisfies a preset condition for the temporary activation of a further application, i.e. a global application, A3. In the example of FIG. 2 the particular application A1 is controllable by a user input E1, which is made by a single input object EO.

FIG. 2 shows, moreover, in a level superposed on the basic level, a global application A3, to which a number of three input objects EO is assigned for its activation and which can be activated by a corresponding input E2 and can be controlled by a subsequent linear input gesture E3 of the three input elements EO. As shown by the dashed lines and as described in connection with FIG. 1, the level model of FIG. 2 can have several superposed levels, which each correspond to a global application A3. Assigned in turn to these several global applications A3 respectively is a different number of input objects varying from one.

FIG. 3 shows a flow chart of an embodiment for a method 300 for controlling motor vehicle applications, for example by means of the motor vehicle operating device 100 in FIG. 1.

In a first step, the method 300 in FIG. 3 comprises providing (310), in a motor vehicle, an activated first application and at least one deactivated further application, wherein a driver can control an activated application by means of input at the presence-sensitive sensor device and cannot control a deactivated application by means of input at the presence-sensitive sensor device. In a further step, the method 300 comprises receiving (320) an input signal, which refers to a number of input objects with which the input is made at the presence-sensitive sensor device, wherein different numbers of input objects are assigned to the applications. For example, the applications are the applications A1, A2, A3 of the examples from FIGS. 1 and 2, to which 1, 2 or 3 input objects EO are assigned respectively.

On receiving the input signal, it is checked whether the number of input objects to which the input signal refers is assigned to the first application. The first application is the particular application A1 from FIGS. 1 and 2, for example, which can be controlled by a single input object EO in a conventional manner. If the input signal EO refers in this case to a single input object, controlling (330) of the first application takes place on the basis of the input signal. If the input signal refers on the other hand to a number of input objects that is not assigned to the first application, i.e. in the present example to more than one input object, it is checked whether this number of input objects is assigned to a further application. These are the applications A2, A3 of the preceding examples, for instance, to which 2 and 3 input objects are assigned respectively.

If the input signal refers to one of these numbers of input objects, then activating (340) of the corresponding further application takes place. The activation of the further application comprises, for example in the case of a navigation application, a provision of further application information to the user. In addition, the activating of the further application can permit the user to take control of the application by further input. Following activation of the further application, it is checked, therefore, whether a further input is made that satisfies one or more preset conditions. If the driver makes a corresponding further input, controlling (360) of the further application takes place on the basis of the further input. Otherwise deactivating (350) of the further application takes place. A renewed activation of the first application takes place at the same time here, for example.

The case of a user input with a number of input objects that is not assigned to any of the applications provided is not determined in the method 300 shown in FIG. 3. Such inputs can be assigned automatically in some examples to the further application to which the highest number of input objects is assigned. In other examples such user inputs can be rejected. In yet other examples such user inputs can activate other functions of the operating device.

In one example the method 300 further comprises, following the control (360) of the further application on the basis of the further input, a determination and output of a control signal for at least one controllable motor vehicle device, which is assigned to the further application. Furthermore, in further examples of the method 300, some or all of the activation and control steps also comprise the output of a display signal and of an acoustic and/or haptic reference signal. Here the method 300 further comprises in some examples a provision of a graphical display on the basis of the display signal that was output.

FIG. 4 shows a schematic view of a further embodiment of the motor vehicle operating device 100 in different operating modes.

What was said in connection with the operating device 100 in FIG. 1 applies accordingly to the operating device 100 in FIG. 4. In particular, the operating device 100 in FIG. 4 is configured to provide different motor vehicle applications A1, A3. Of these, a first application A1 is preferably activated as a particular application, whereas a user input E3, which refers to a number of input objects at the operating device 100, causes a switch to a further application A3.

Figures 4A, 4B, 4C:
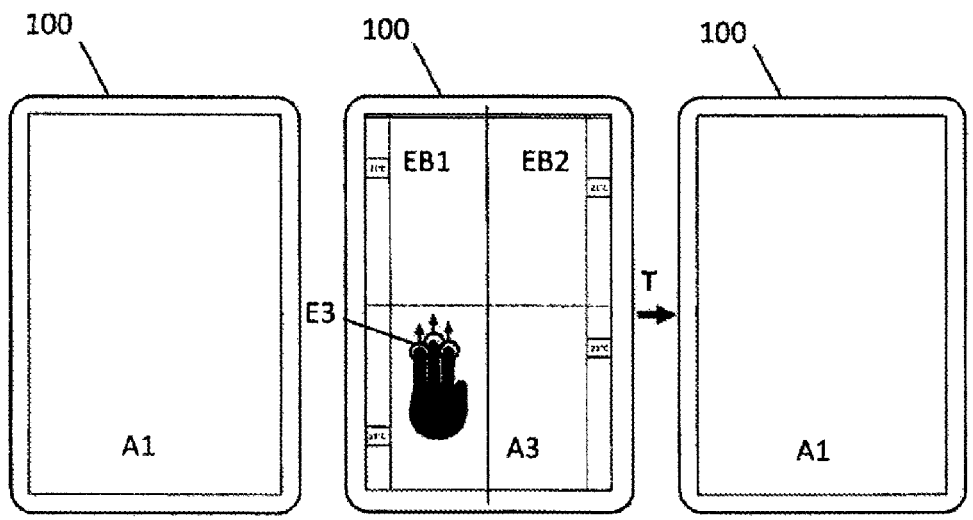
FIGS. 4a-4c show schematic representations of a further embodiment for a motor vehicle operating device with different activated motor vehicle applications.

By analogy with FIG. 1a, FIG. 4a shows the operating device 100 in a first operating mode, in which the particular application A1 is activated. Deviating from the example FIG. 1b, FIG. 4b shows the operating device 100 in an operating mode, however, in which a further application A3 deviating from the further application A2 is activated. A number of 3 input objects is assigned here to the further application A3. The application A3 is thus activated by the user input E3 shown in FIG. 4b by three fingers and can be controlled by a linear input gesture. Further deviating from the example in FIG. 1b, an input field of the operating device 100 is divided into several input areas EB1, EB2 in the case of the application A3 in FIG. 4b. The control of the application A3 takes place as a function of the input area EB1, EB2, in which the input E3 is made.

The different input areas EB1, EB2 are assigned, for example, to different areas of a motor vehicle into which the operating device 100 is integrated. The application A3 is configured here to control an actuating value of a vehicle device for each of these vehicle areas at least partly independently of one another. For example, a temperature actuating value of a motor vehicle air conditioning system can be set independently for different seating areas of the vehicle by the application A3. As indicated in FIG. 4b, for such seat-specific control of a motor vehicle device an operating field of the operating device 100 can be divided into four input areas EB1, EB2. While the division described of the input field of the operating device 100 thus offers a larger selection of functions, which are controllable by means of the technique described here, a corresponding division of the operating field should not adversely affect an intuitive and easy operability of the further applications A2, A3. However, in the case of conventional operating fields a division into up to four areas has not turned out to be disadvantageous.

As also shown in the example in FIG. 4, a display signal that refers to the activated application and the control undertaken can also be output in the case of activation and control of the application A3. In the example shown, the display also shows the input area EB1, EB2 and thus the vehicle area in relation to which the input E3 is made.

Corresponding to the example from FIG. 1c, FIG. 4c also shows the automatic renewed activation of the particular application A1 when the condition T is present. With reference to the condition T for the renewed activation of the particular application A1 and the simultaneous deactivation of the further application A3, what was said about the example in FIG. 1c applies accordingly.

Figure 5:
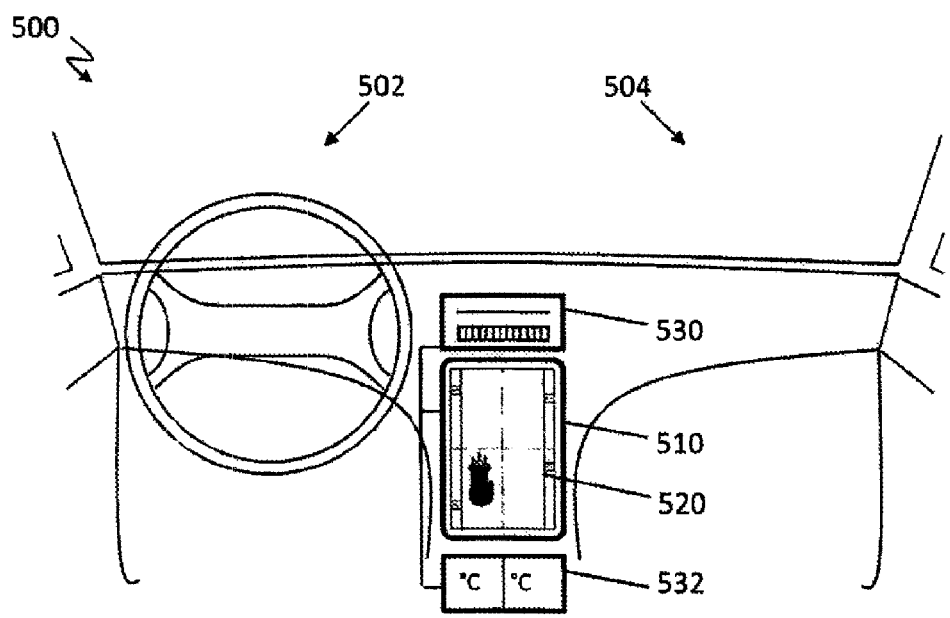
FIG. 5 shows a schematic representation of an embodiment for a motor vehicle with a motor vehicle operating device.

FIG. 5 shows a schematic view of an embodiment for a motor vehicle 500 with a motor vehicle operating device 510 of the type described above.

The motor vehicle 500 comprises a driver area 502 and a passenger area 504. In addition, the motor vehicle 500 comprises several motor vehicle devices 530, 532, which are controllable by the motor vehicle operating device 510. According to the examples described previously, the operating device 510 has a presence-sensitive sensor device 520, which is likewise executed as a touchscreen in the example shown.

The motor vehicle devices 530, 532 are a motor vehicle audio system 530 and a motor vehicle air conditioning system 532, for example. Beyond the motor vehicle devices shown, however, the motor vehicle 500 can also comprise further motor vehicle devices, which are controllable by the operating device 510, for example a motor vehicle communication device for a motor vehicle online application, a motor vehicle communication device for a telephone application, a motor vehicle driver assistance system, a motor vehicle sliding roof or a motor vehicle external mirror.

What was said regarding the preceding examples from FIGS. 1 to 4 applies accordingly to the motor vehicle operating device 510 in FIG. 5. Thus the operating device 510 is configured to provide, apart from a particular application A1, at least one further global application A2, A3. By means of this the driver can determine as a function of a number of input objects at the operating device 510, independently of a previously selected particular application A1, a control signal for one of the motor vehicle devices 530, 532, which signal is output by the operating device 510 to the corresponding motor vehicle device 530, 532. As described in connection with FIG. 4b, such a control signal can be determined independently for each of the vehicle areas 502, 504.

In addition to the examples shown of a motor vehicle audio system and a motor vehicle air conditioning system, the motor vehicle 500 can comprise further vehicle devices controllable by the operating device 510. These include, for example, a motor vehicle navigation system, automatic window winders, an automatic door locking system, a motor vehicle driver assistance system, a motor vehicle communication device for a motor vehicle online application, an external mirror, a sliding roof and a motor vehicle communication device for a motor vehicle telephone application. The motor vehicle operating device 510 here permits in the manner described above, independently of a currently activated particular application A1, the control of one or more main functions and/or safety-relevant functions of one or more of said motor vehicle devices 530, 532 by simple and intuitive user input without permanently deactivating the previously selected particular application A1. Instead, a particular application A1 selected in this way is automatically made available to the driver again after control of a main function has been undertaken according to one of the global applications.

When using a multifunctional operating element in a motor vehicle, the techniques described here make it possible on the one hand to make available for the driver a plurality of equipment functions through a plurality of control options in a known manner. At the same time, the described technique of intuitive control of global applications depending on the number of fingers guarantees simple and intuitive access to particularly relevant functions in the motor vehicle without the driver having to divert his attention from traffic events for this. The techniques described have been described in the particular context of a motor vehicle and in connection with certain controllable motor vehicle devices. However, it is obvious that the techniques presented can also find advantageous application even away from the examples described.

The invention claimed is:

1. A motor vehicle, comprising a motor vehicle operating device for controlling motor vehicle applications, wherein the motor vehicle operating device comprises a presence-sensitive sensor device and is configured to:
provide, in the motor vehicle, an activated first application and at least one deactivated further application, wherein a driver can control an activated application by means of input at the presence-sensitive sensor device and cannot control a deactivated application by means of input at the presence-sensitive sensor device;
receive an input signal, which refers to a number of input objects with which an input is made at the presence-sensitive sensor device, wherein different numbers of input objects are assigned to the applications;
if the input signal refers to a number of input objects that is assigned to the first application, control the first application on the basis of the input signal and, if the input signal refers to a number of input objects that is assigned to the further application, activate the further application, and
if the further application is activated and if a further input is made that satisfies a preset condition, controlling the further application on the basis of the further input, wherein the controlling of the further application takes place on the basis of a primary gesture, which comprises an at least substantially linear movement of the one or more input objects on the presence-sensitive sensor device,
wherein the number of input objects assigned to the first application amounts to one and wherein a number of input objects that amounts to more than one is assigned to each further application, wherein the motor vehicle further comprises at least one controllable motor vehicle operating device, wherein the further application is configured to determine a control signal for the motor vehicle operating device on the basis of the input, and wherein the motor vehicle operating device is further configured to output the control signal to the motor vehicle operating device,
wherein the input signal also refers to one of several input areas of the sensor device, in which the input is made, and
wherein the motor vehicle operating device is further configured to control the further application on the basis of the input area, and wherein the input areas of the sensor device are assigned to different areas of the motor vehicle and the control signal is determined in relation to the area of the motor vehicle to which the input area that the input signal refers to is assigned, wherein the control signal is for controlling an actuating value of the motor vehicle operating device for the assigned area of the motor vehicle at least partly independently from actuating values of the motor vehicle operating device for the other areas of the motor vehicle.

2. The motor vehicle according to claim 1, wherein the motor vehicle operating device is at least one of a motor vehicle audio system, a motor vehicle air conditioning system, a motor vehicle communication device for a motor vehicle online application, a motor vehicle communication device for a telephone application, a motor vehicle sliding roof, a motor vehicle external mirror and an automatic window winder.

3. A method for controlling motor vehicle applications using a presence-sensitive sensor device, comprising:
providing, in the motor vehicle, an activated first application and at least one deactivated further application, wherein a driver can control an activated application by means of input at the presence-sensitive sensor device and cannot control a deactivated application by means of input at the presence-sensitive sensor device;
receiving an input signal, which refers to a number of input objects with which an input is made at the presence-sensitive sensor device, wherein different numbers of input objects are assigned to the applications;
if the input signal refers to a number of input objects that is assigned to the first application, controlling the first application on the basis of the input signal and, if the input signal refers to a number of input objects that is assigned to the further application, activating the further application, and
if the further application is activated and if a further input is made that satisfies a preset condition, controlling the further application on the basis of the further input, wherein the controlling of the further application takes place on the basis of a primary gesture, which comprises an at least substantially linear movement of the one or more input objects on the presence-sensitive sensor device,
wherein the number of input objects assigned to the first application amounts to one and wherein a number of input objects that amounts to more than one is assigned to each further application,
wherein the further application is configured to determine a control signal for at least one controllable motor vehicle operating device on the basis of the input, and wherein the method further comprises an outputting of the control signal,
wherein the input signal also refers to one of several input areas of the sensor device, in which the input is made, and wherein the controlling of the further application further takes place on the basis of the input area, and wherein the input areas of the sensor device are assigned to different areas of the motor vehicle and the control signal is determined in relation to the area of the motor vehicle to which the input area that the input signal refers to is assigned, and wherein the control signal is for controlling an actuating value of the motor vehicle operating device for the assigned area of the motor vehicle at least partly independently from actuating values of the motor vehicle operating device for the other areas of the motor vehicle.

4. The method according to claim 3, further comprising:
if the further application is activated and if no further input is made that satisfies the preset condition, deactivating the further application.

5. The method according to claim 4, wherein the preset condition requires that the further input follows without interruption the input on the basis of which the further application was activated.

6. The method according to claim 4, wherein the preset condition requires that the further input follows a previous input within a predetermined period.

7. The method according to claim 4, wherein the preset condition further requires that the further input is also made using the number of input objects that is assigned to the further application.

8. The method according to claim 3, wherein upon activation of an application, a previously activated application is deactivated.

9. The method according to claim 3, wherein the activating of an application further comprises outputting a display signal, which is assigned to the activated application.

10. The method according to claim 9, wherein the display signal is configured to refer to a controlling of the application on the basis of the input signal.

11. The method according to claim 9, further comprising:
if the further application is activated and if no further input is made that satisfies the preset condition, deactivating the further application,
wherein the display signal is further configured to refer to the area of the motor vehicle in relation to which the control signal is determined.

12. The method according to claim 9, further comprising: providing a graphical display on the basis of the display signal.

* * * * *

UNITED STATES PATENT AND TRADEMARK OFFICE
CERTIFICATE OF CORRECTION

| | | |
|---|---|---|
| PATENT NO. | : 9,933,885 B2 | Page 1 of 1 |
| APPLICATION NO. | : 14/824470 | |
| DATED | : April 3, 2018 | |
| INVENTOR(S) | : Rene Steiger | |

It is certified that error appears in the above-identified patent and that said Letters Patent is hereby corrected as shown below:

On the Title Page

Item (73) Assignees:
"E.Solutions GmbH (DE)"
Should read:
--e.solutions GmbH (DE)--

Signed and Sealed this
Eighteenth Day of December, 2018

Andrei Iancu
*Director of the United States Patent and Trademark Office*